May 19, 1925.  S. H. CAMPBELL  1,537,934
BRAKE MECHANISM
Filed Sept. 26, 1924
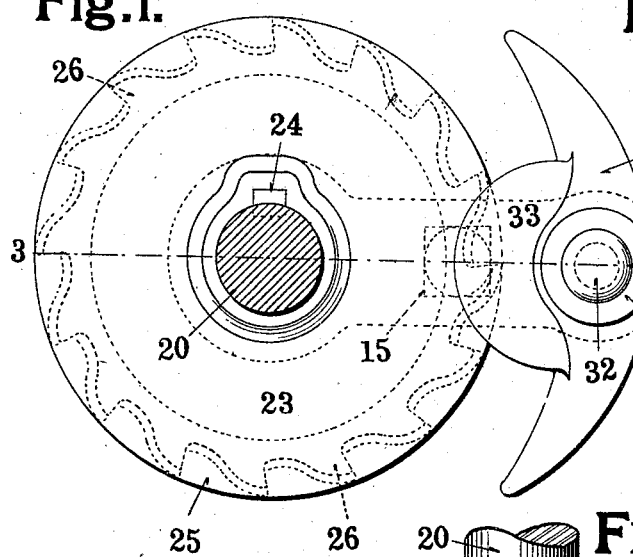
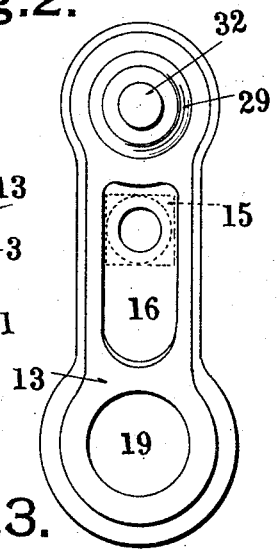
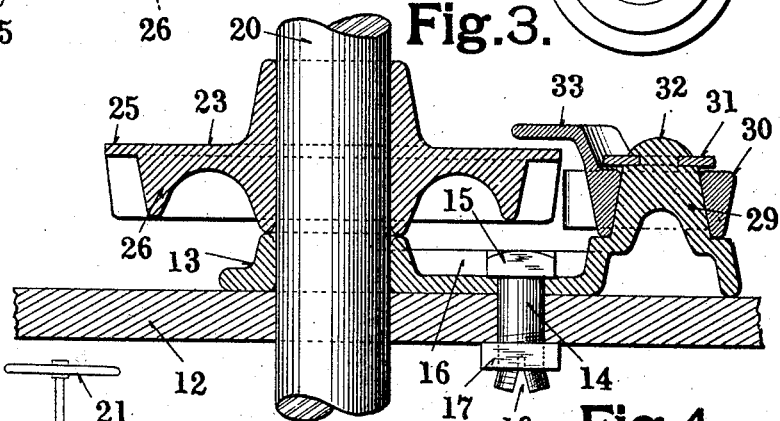
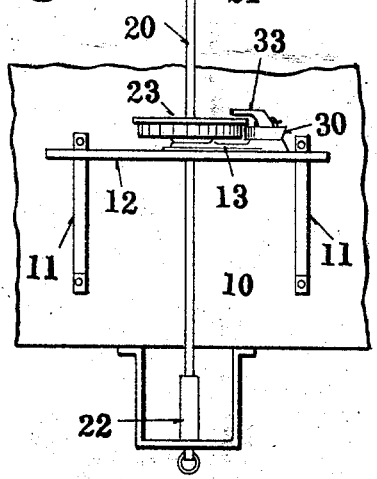
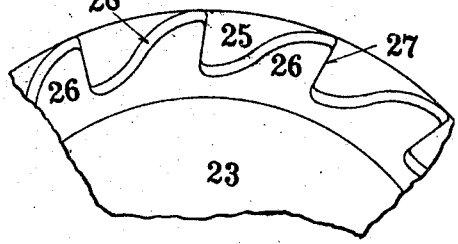
INVENTOR
S. H. CAMPBELL
BY E. E. Huffman
ATTORNEY Patented May 19, 1925.

1,537,934

UNITED STATES PATENT OFFICE.

STERLING H. CAMPBELL, OF ST. LOUIS, MISSOURI, ASSIGNOR TO WESTERN RAILWAY EQUIPMENT COMPANY, OF ST. LOUIS, MISSOURI, A CORPORATION OF MISSOURI.

BRAKE MECHANISM.

Application filed September 26, 1924. Serial No. 740,064.

*To all whom it may concern:*

Be it known that I, STERLING H. CAMPBELL, a citizen of the United States of America, residing at the city of St. Louis, Missouri, United States of America, have invented a certain new and useful Brake Mechanism, of which the following is such a full, clear, and exact description as will enable any one skilled in the art to which it appertains to make and use the same, reference being had to the accompanying drawings, forming part of this specification.

My invention relates to a brake mechanism and more particularly to that type of brake mechanism known as a hand brake.

The object of my invention is to provide a simple, strong and efficient device in which the pawl will limit the longitudinal movement of the ratchet wheel without interfering with the proper operation of the latter, and in which the fastening means for the base plate will be protected by the said wheel.

In the accompanying drawings, which illustrate one form of brake mechanism made in accordance with my invention, Figure 1 is a top plan view; Figure 2 is a detail view of the base plate; Figure 3 is a section taken on the line 3—3 of Figure 1; Figure 4 is an enlarged bottom view of a portion of the ratchet wheel; and Figure 5 is an end elevation, on a reduced scale, of the brake mechanism together with a portion of a railway car to which the same is applied.

Secured to the end of a railway car, indicated at 10, by means of brackets 11, is a shelf or support 12. The base plate 13 is fastened to the support by means of a bolt 14, the head 15 of which seats in a recess 16 to prevent rotation of the bolt when the nut 17 is tightened. A slot 18 is preferably formed in the end of the bolt so that it may be spread by the insertion of a suitable tool to form a nut lock. Formed in one end of the base plate is an opening 19 for the passage of the brake staff 20 provided with a hand wheel 21 and seated in a step 22 in the usual manner.

Surrounding the brake staff directly above the base plate is the ratchet wheel 23 which is prevented from rotation relative to the staff of a key 24, or any other suitable means. Formed on the upper side of the wheel is an integral flange 25, which not only strengthens the teeth 26 but also protects the teeth from accumulations of dust and dirt and cooperates with a guard on the pawl, as will be hereinafter described, to hold the wheel against longitudinal movement. The front faces 27 of the teeth are perpendicular to the plane of the flange to insure proper cooperation with the pawl, while the rear faces 28 are inclined to provide draft. This construction enables the wheel to be drop forged, as is more fully set forth in another application for patent filed by me under even date herewith.

Carried on the end of the base plate opposite the opening 19 is a pawl bearing 29, preferably in the form of a frustum of a cone. Mounted on the bearing 29 is a pawl 30 which is permanently held in place by a washer 31 secured by a rivet 32, formed integral with the bearing. Carried by the pawl and overlapping the flange 25 of the ratchet wheel is a guard 33 which prevents longitudinal movement of the wheel, but as it is separated from the teeth by the flange it cannot in any way interfere with the rotation of the wheel.

In assembling the device the base plate with its permanently attached pawl, and the ratchet wheel in position under the guard 33, is lowered over the staff, the hand wheel being removed. The nut 17 is then applied to secure the parts in position. As the fastening bolt 14 is covered by the ratchet wheel, it will be evident that it will be impossible to disassemble the parts with the brake staff in position.

Having fully described my invention, what I claim as new and desire to secure by Letters Patent of the United States is:

1. In a device of the class described, the combination with a base plate, of a brake staff mounted therein, a ratchet wheel on said staff, a pawl bearing forming a part of the base plate and provided with an integral rivet, a pawl carried on said bearing and permanently secured in place by said rivet, and a guard carried by said pawl and overlapping the wheel.

2. In a device of the class described, the combination with a base plate, of a brake staff mounted therein, a ratchet wheel on said staff, a pawl carried by said base plate, a guard on said plate overlapping said wheel, and fastening means for the plate covered by the wheel.

3. In a device of the class described, the combination with a base plate, of a brake staff mounted therein, a ratchet wheel on said staff provided with a flange extending over its teeth, a pawl permanently secured to the base plate, a guard on said pawl overlapping said flange, and fastening means for the base plate covered by the ratchet wheel.

4. In a device of the class described, the combination with a base plate, of a brake staff mounted therein, a ratchet wheel on said staff, a pawl carried by said base plate and cooperating with the wheel, and fastening means for the base plate situated between said pawl and brake staff.

5. In a device of the class described, the combination with a base plate, of a brake staff mounted therein, a ratchet wheel on said staff, a pawl carried by said base plate and cooperating with said wheel, and a fastening bolt passing through said base plate, said base plate being provided with means preventing the rotation of said bolt.

In testimony whereof, I have hereunto set my hand this the 18th day of September, 1924.

STERLING H. CAMPBELL. [L. S.]